(12) United States Patent
Iasillo et al.

(10) Patent No.: US 6,205,765 B1
(45) Date of Patent: Mar. 27, 2001

(54) APPARATUS AND METHOD FOR ACTIVE CONTROL OF OSCILLATIONS IN GAS TURBINE COMBUSTORS

(75) Inventors: Robert J. Iasillo, Glenville; Lewis Berkley Davis, Jr., Niskayuna; Stephen Hugh Black, Duanesburg, all of NY (US)

(73) Assignee: General Electric Co., Schenectady, NY (US)

(*) Notice: Subject to any disclaimer, the term of this patent is extended or adjusted under 35 U.S.C. 154(b) by 0 days.

(21) Appl. No.: 09/413,665

(22) Filed: Oct. 6, 1999

(51) Int. Cl.$^7$ .................................. F02C 7/22; F02C 9/26
(52) U.S. Cl. ........................... 60/39.06; 60/725; 431/114
(58) Field of Search ................................ 60/39.06, 725, 60/740; 431/1, 114

(56) References Cited

U.S. PATENT DOCUMENTS

| | | | |
|---|---|---|---|
| 3,053,047 | * 9/1962 | Bodemuller | 60/39.281 |
| 5,145,355 | * 9/1992 | Poinsot et al. | 431/114 |
| 5,211,004 | 5/1993 | Black . | |
| 5,428,951 | * 7/1995 | Wilson et al. | 60/725 |
| 5,784,889 | * 7/1998 | Joos et al. | 60/725 |
| 5,797,266 | * 8/1998 | Brocard et al. | 60/725 |
| 5,809,769 | * 9/1998 | Richards et al. | 60/725 |

OTHER PUBLICATIONS

Hoffman et al; "Application of Active Combustion Control to Siemens Heavy Duty Gas Turbines"; Presented at the Symposium of the AVT Panel on Gas Turbine Engine Combustion, Emissions and Alternative Fuels, Lisbon Oct. 12–16, 1998; pp. 1–12.

Cohen et al; Active Control of Combustion Instability in a Liquid—Fueled Low—No$_x$ Combustor, Presented at the International Gas Turbine & Aeroengine Congress & Exhibition Stockholm, Sweden; Jun. 2–Jun. 5, 1998; pp. 1–9.

Scalzo et al; Solution of Combustor Noise in a Coal Gasification Cogeneration Application of 100–MW–Class Combustion Turbines; Transactions of the ASME Journal of Engineering for Gas Turbines and Power, vol. 112/39; Jan. 1990; pp. 39–43.

Seume et al; Application of Active Combustion Instability Control to a Heavy Duty Gas Turbine; ASME Paper No. 97–AA–119, presented Sep. 30 –Oct. 2, 1997 at the ASME ASIA '97 Congress & Exhibition Singapore; pp. 721–726.

Annaswamy et al; Active Control in Combustion Systems; IEEE Control Systems; IEEE Control Systems; Dec. 1995; pp. 49–63.

* cited by examiner

*Primary Examiner*—Louis J. Casaregola
(74) *Attorney, Agent, or Firm*—Nixon & Vanderhye

(57) ABSTRACT

An apparatus and method of applying active, closed loop control to reduce combustion driven pressure oscillation in a single or multi-chamber combustion system in an industrial gas turbine, to increase operability and life of the parts, and in such a way as to require minimal input power. The invention combines the passive control of a two stage nozzle with active control thereby to reduce the requirements on the control device. This allows selection of a control device which will have an adequate life in an industrial environment and yet require minimal input power.

15 Claims, 4 Drawing Sheets

APPARATUS AND METHOD FOR ACTIVE CONTROL OF OSCILLATIONS IN GAS TURBINE COMBUSTORS

BACKGROUND OF THE INVENTION

The present invention relates to apparatus and methods for active control of dynamic pressure oscillations in a gas turbine combustion system. More particularly, the invention relates to using active feedback and control drivers to reduce combustion dynamics in an industrial gas turbine combustion system with single or multiple chambers which are linked to each other through their fuel systems and common air supply.

High dynamics can limit hardware life and/or system operability. Thus, there have been various attempts to control combustion dynamics, to prevent degradation of system performance. There are two basic methods for controlling combustion dynamics in an industrial gas turbine combustion system: passive control and active control. As the name suggests, passive control refers to a system that incorporates certain design features and characteristics to reduce dynamic pressure oscillations. Active control, on the other hand, incorporates a sensor to detect, e.g., pressure fluctuations and to provide a feedback signal which, when suitably processed by a controller, provides an input signal to a control device. The control device in turn operates to reduce the dynamic pressure oscillations.

An effective method for passive control of pressure oscillations in industrial gas turbine combustors is disclosed in U.S. Pat. No. 5,211,004, the entire disclosure of which is incorporated herein by this reference. The '004 patent describes a fuel supply system having a fuel passage with an upstream orifice, a downstream discharge orifice and a captured response volume defined between the orifices. The upstream orifice has a high-pressure drop for performing the function of isolating the fuel system from the premix zone and providing uniform fuel distribution. Moreover, the upstream orifice provides a pressure drop such that in the pressure in the captured response volume approximates the pressure of the compressor discharge air. The downstream orifice provides a low pressure drop from the captured response volume to the combustor. The level of the downstream pressure drop is selected so that the fuel system has a specific phase response as compared to that of the air system. This two-stage nozzle has been very effective in reducing combustion dynamics related to the fluctuation of fuel/air ratio concentration by matching fuel system and air system responses to pressure fluctuations.

There have also been developments in the area of active control. See, e.g., Annaswamy et al., "Active Control in Combustion Systems," IEEE Control Systems, December, 1995, pp 45–63, which is incorporated herein by this reference. As previously mentioned, active control requires that a sensor be provided to supply feedback, a controller to process the feedback signal into a control signal and a control device responsive to the control signal. On laboratory scale combustion test rigs, such systems have been generally effective in controlling dynamic pressure oscillations by applying a control device to either the air system or the fuel system of the combustor. Typically, the pressure control device, such as a loud speaker, has been applied for control of the air system while a flow control device, such as a valve, has been applied for control of the fuel system. Most of the work has focused on controlling a single laboratory scale reaction zone.

However, even with a laboratory scale reaction zone, there have been issues with both the frequency response and power consumption of the control device. Usually, power consumption is a problem for the air system control whereas frequency response is the issue for fuel system control. As will be appreciated, for an industrial scale gas turbine (30–250 mW) the air and fuel flows are orders of magnitude larger. Thus, these issues have severely limited the applicability of active control schemes. To the inventors knowledge there has not been a successful application of such an active control scheme to an industrial gas turbine.

BRIEF SUMMARY OF THE INVENTION

It was the purpose of the invention to provide apparatus and methods of applying active, closed loop control to reduce combustion driven pressure oscillation in a single or multi-chamber combustion system in an industrial gas turbine, to increase operability and life of the parts, and in such a way as to require minimal input power. To accomplish the foregoing, the invention combines passive control and active control thereby to reduce the requirements on the control device. This allows selection of a control device which will have an adequate life in an industrial environment and yet require minimal input power.

Specifically, the invention enhances the performance of the passive control afforded by a two stage fuel nozzle, such as disclosed in U.S. Pat. No. 5,211,004, by the addition of a closed loop active control system. The application of such an active control system to the two stage nozzle enhances the performance of the latter by improving its frequency response capability. In the presently proposed implementation of the invention, the active control is applied to the fuel system rather than directly to the combustion chamber. More specifically, in conjunction with the two stage nozzle concept of U.S. Pat. No. 5,211,004, the control device is positioned to act on the captured response volume located between the high and low pressure drop orifices.

The active control system of the invention can be readily applied to each combustion chamber of a multiple combustor gas turbine as the effects of phase differences from one combustor to the next can be sensed by sensors mounted in each chamber and appropriate closed loop control can be applied to each chamber.

The active control system thus operates by measuring the frequency or frequencies of dynamic pressure oscillations in the respective combustors. That information is fed to a controller which processes the signal using appropriate algorithms and transmits a command signal to a pressure driver, volume driver or similar such control device, to create pressure pulses at specific frequencies and phase angles in the captured response volume. This feedback can be used to control response of fuel flow to the original pressure pulsation so that the variations in fuel/air concentration can be controlled as required. This in turn allows control of the pressure oscillation inside the combustor. The algorithms may be appropriately provided for enhancing or reducing the pressure pulsations in the combustion chamber, as required.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
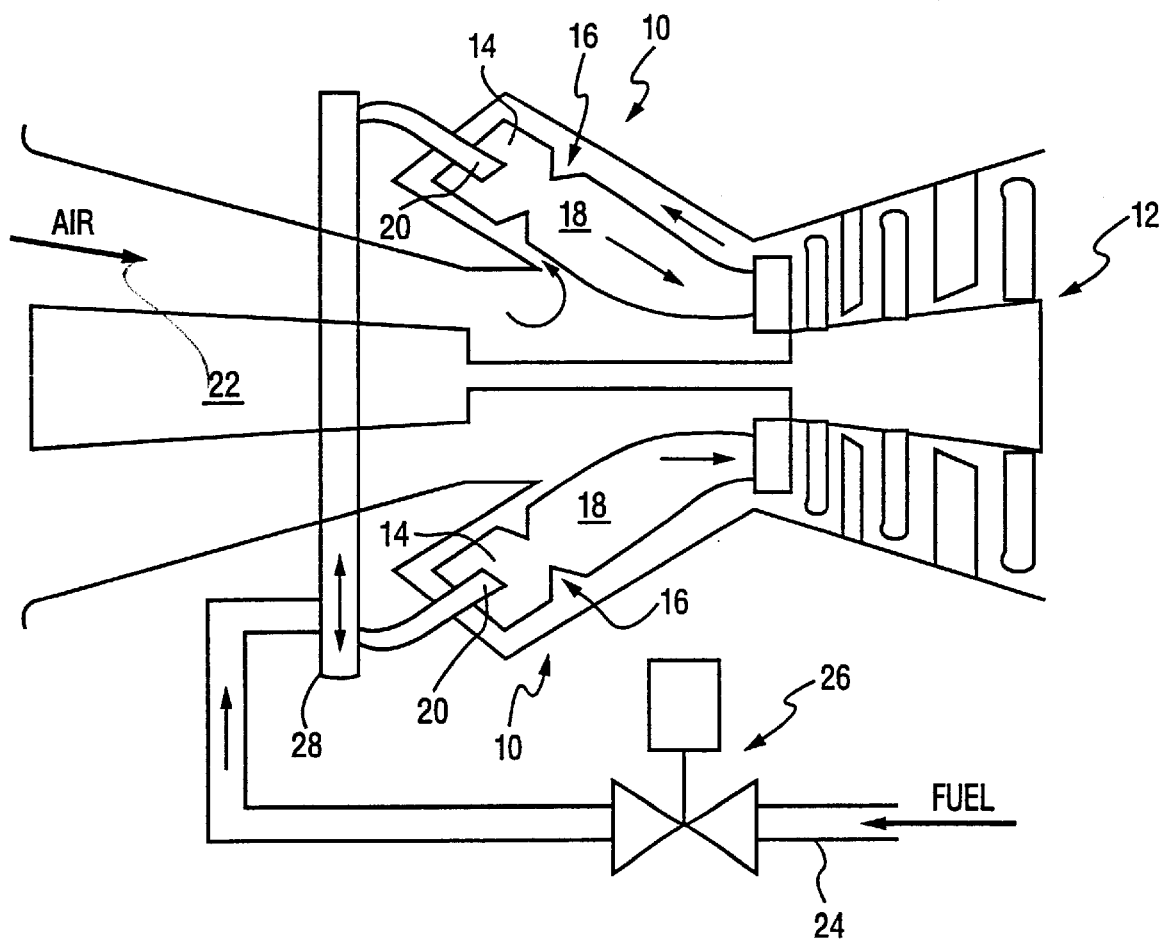
FIG. 1 is a schematic cross-sectional view of a typical industrial gas turbine fuel system with a reverse flow combustion system.

Referring to FIG. 1, there is illustrated a typical low emissions lean premix combustion system, including combustors, each generally designated 10, for generating and delivering hot gases of combustion to the first stage nozzle of the turbine 12. In each combustor there is provided a premixing zone 14, a flame holder 16 and a reaction zone 18. In the lean premix combustion process, the fuel and air are delivered separately from supply sources with different dynamic characteristics relative to the premixing zone. More specifically, fuel nozzles 20 respectively deliver fuel, which is mixed in premixing zone 14 with discharge air from the compressor 22. Fuel flows to the fuel nozzles in this example through inlet line 24, fuel control valve(s) schematically shown at 26 and through a manifold 28 for conducting the fuel to the various fuel nozzles 20. On entering the reaction zone, the premixed fuel/air mixture is ignited by the hot gases maintained in the sheltered zone of the flame holder 16. After combustion, the resulting hot gas flows through the first-stage turbine nozzle, which directs the flow for expansion through the first-stage turbine blades. As illustrated, a plurality of combustors 10 are disposed in an annular array about the turbine housing. Typically, 1 to 18 combustors are provided depending on the frame size.

The invention is preferably embodied in a low emissions lean premix combustion system of the type described above, wherein active control as described herein below is used in conjunction with the two stage nozzle, passive control device of the '004 patent, with the active control device positioned to act on the small volume between the high and low pressure drop orifices of the nozzle. The implementation of the invention is thus illustrated by way of example with reference to a schematic representation of that two stage nozzle in FIGS. 2 and 3.

Figure 2:
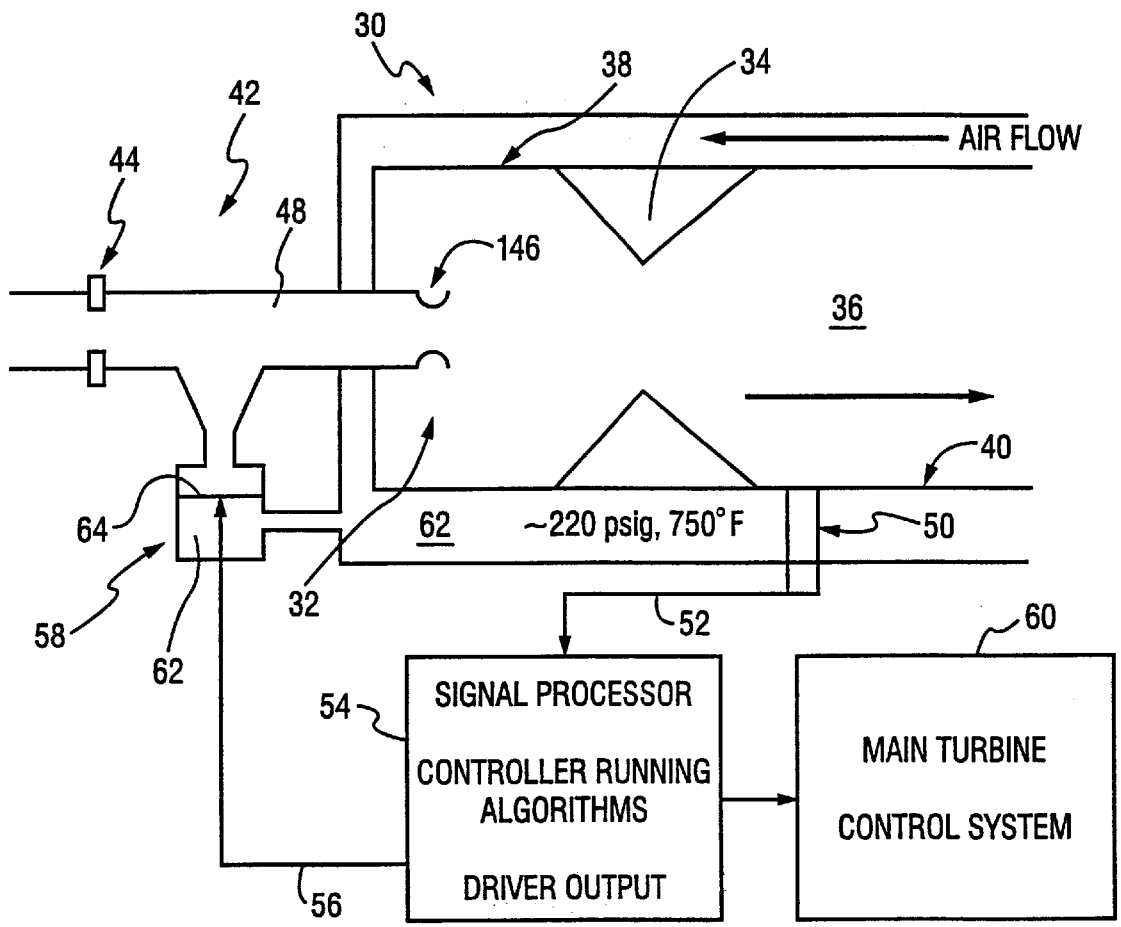
FIG. 2 is a schematic elevational view of a combustor layout with active dynamic feedback control provided in accordance with an exemplary embodiment of the invention.

Referring now to FIG. 2, there is schematically illustrated an combined passive/active dynamics control system in accordance with a first embodiment of the invention. The illustrated portion of the combustion system includes a combustor generally designated 30 including a fuel/air premixer zone 32, a flame holder 34, a reaction zone 36, a liner assembly 38 for the premixer zone and a liner assembly 40 for the reaction zone.

FIG. 2 also schematically depicts a two stage fuel nozzle 42, preferably constructed in accordance with the disclosure of the '004 patent, for delivering fuel to the premixer zone 32 where the fuel is mixed with the compressor discharge air that passes through openings (not shown) in the liner 38 of the premixer zone. Not illustrated in FIG. 2 is the transition piece extending from the reaction zone for delivering hot gases of combustion to the first stage nozzles. The illustrated combustor may be one of several combustors provided in a multi-chamber combustor layout.

As previously noted, the inventive system incorporates both passive and active control of dynamic pressure oscillations. For passively preventing pressure induced fluctuations in fuel/air concentration, while maintaining isolation of the fuel system from the combustion chamber and providing uniform fuel distribution, the fuel supply system is provided with an upstream fuel orifice 44 affording a high pressure drop and a downstream orifice 46 having a low pressure drop, the two orifices being separated by a volume 48, hereinafter referred to as a captured response volume 48. In the illustrated embodiment, the compressor discharge air is at a temperature of about 750° F. and a pressure of about 220 psig. In the two stage fuel nozzle, the pressure upstream of the upstream orifice is about 290 psig, the upstream orifice 44 effecting a pressure drop from about 290 psig to about 210 psig. The second pressure drop orifice 46 effects only a small pressure drop to, e.g., 207 psig in the premix zone.

The active control system provided in the embodiment of FIG. 2 includes a sensor 50 operatively coupled to the combustor reaction zone liner 40 for detecting pressure fluctuations and/or other variables comprising inputs to the feedback system. Since a dominant manifestation of unstable combustion processes is growing pressure oscillations, it is important that the sensor 50 provide the necessary information quickly and accurately. An exemplary sensor for this purpose would be a pressure transducer such as a microphone. Optical sensors can provide information regarding other system variables such as temperature and velocity, and thus may also be considered for use in the control design. Photodiodes and radiometers are examples of other monitors/monitoring systems that may be used, in addition or in the alternative, to obtain feedback information.

The system processor 54 receives the sensor feedback signal(s) 52 as input and transforms that signal into a control signal 56 for output to the control device 58. The system processor 54 desirably has multiple capabilities including not only input signal processing but control execution and output signal processing. Information from the system processor 54 can also be sent to the main control system 60 to provide protection and alarm functions.

Figure 4:
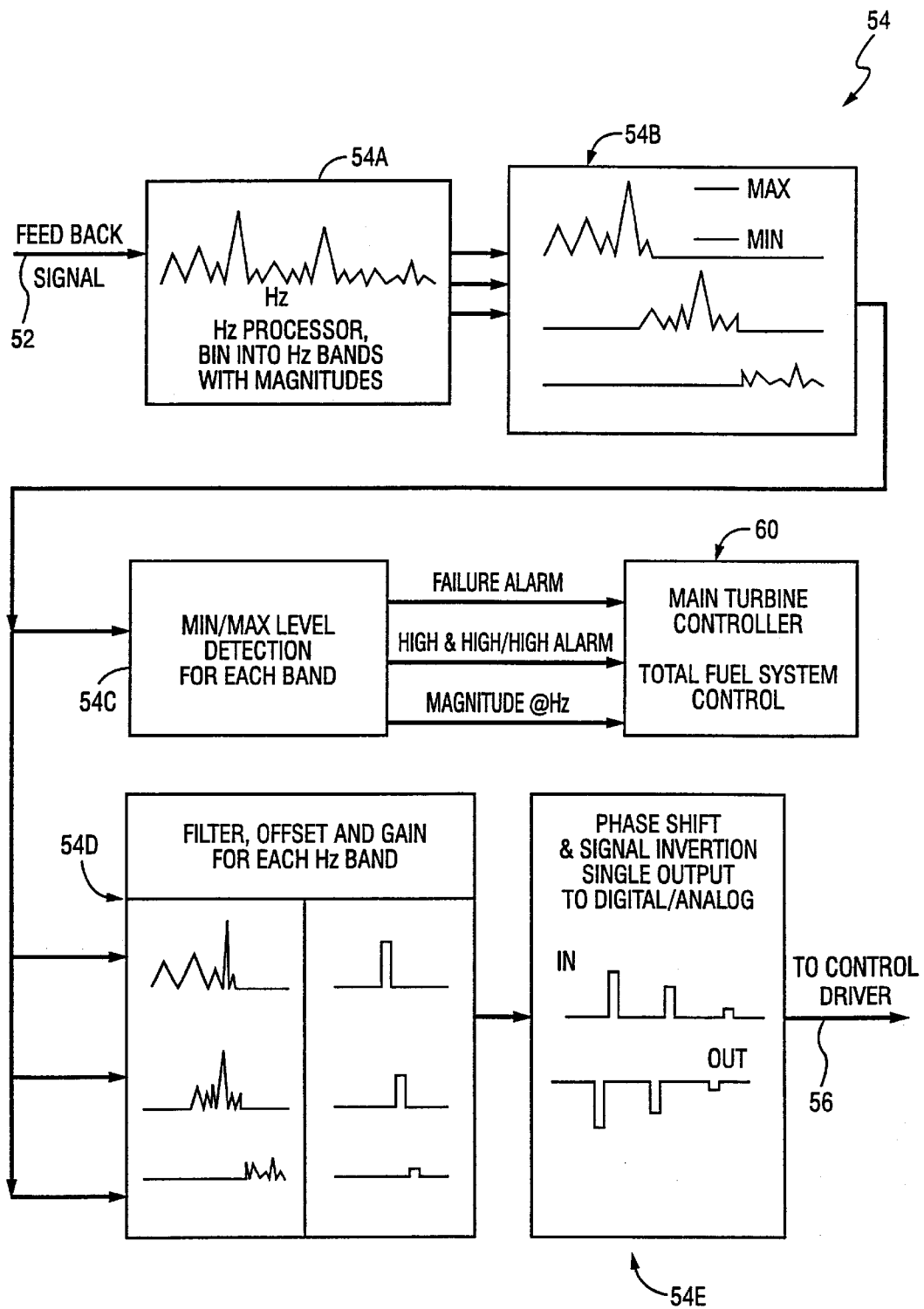
FIG. 4 is a process flow chart for active dynamic combustion control in accordance with an exemplary embodiment of the invention.

A process flow chart for active dynamic combustion control is shown by way of example in FIG. 4. In this exemplary embodiment, feedback signal 52 is sent into a frequency processor 54A that takes the frequency signature and converts it into dynamic levels at different frequencies (an example could be FFT or Fast Foray Transform), that are then split into frequency bands. The different bands are then processed by being passed thorough a maximum and minimum filter 54B. This information is then sent on to be processed to determine if the level is outside the min/max level for each band 54C. This information is then sent on to the main turbine control panel 60 for failure detection, alarming for high level, and high/high alarm level. With a magnitude and frequency (Hz) for each given frequency band supplied to the main controller, global or total fuel control could be modulated in addition to the individual fuel nozzles active dynamic control. This gives an additional adjustment to further optimize the reduction of dynamics as well as provides basic system level monitoring.

The individual frequency band data is also sent to a filter 54D (for a time weighting average if needed) where a gain and offset can be applied to produce an individual dominant signal. The individual signals are then recombined, and a phase shift can be applied (to offset the systems time delay), which would then be inverted 54E to generate a canceling signal to apply to the control driver 56.

The basic idea of taking a feedback, determining the dominate frequency at a magnitude, applying a gain/offset, phase shift, then inverting the signal to a driver which cancels out the dynamic oscillation as been demonstrated in a number of applications. One example would be noise canceling headsets used by pilots. This mixing of both global fuel control and single can fuel control in combination is a more unique application of active dynamics control.

The active dynamic feedback control in the presently preferred embodiments acts on the captured response volume 48. The control provided by the control device is intended to affect/counter the sensed unsteady pressure and/or velocity field by introducing disturbances in acoustic pressure, velocity, fuel or air mass flow, heat release, or a combination of the above. Suitable control devices that may be adopted in accordance with the invention include, for example, a pressure driver (e.g. a speaker as shown in FIG. 2 and described below with reference thereto), a moving flap or panel, a single or a plurality of jets (described below with reference to FIG. 3), a swirl generator and/or a heating element. The suitability of one or more such actuators, or another control device, will depend upon their ability to introduce an action producing a fast system response over a desired range of frequencies while consuming very little energy.

The embodiment of FIG. 2 provides a control device 58 in the form of a pressure driver, such as a speaker or similar such device, for acting on the captured response volume 48. Thus, the pressure driver is located downstream of the fuel nozzle main pressure drop orifice 44 but upstream of the lower pressure drop orifice 46 which is the discharge point into the combustor. In the illustrated embodiment, the pressure driver 58 is a pressure balanced system. That is, it uses the compressor discharge pressure 62, which is typically 5 to 7% higher than the combustor pressure, to balance the pressures across the membrane 64 of the device 58 and thereby minimize power consumption.

By locating the pressure driver 58 to act in the middle of the passive control device, in particular on the captured response volume 48, several advantages are realized.

The passive phase adjustment feature provided by the two stage nozzle (described fully in U.S. Pat. No. 5,211,004) will provide the major correction for control of pressure oscillations. The active control system will optimize, or trim, the basic response of the passive device to further reduce pressure oscillations. This, in combination with the pressure balanced feature of the driver, will substantially reduce the power consumption that would be required to generate the desired result.

With a small volume, low pressure differential, and low power requirements, the pressure driving device will be small. This improves frequency response, reliability and packaging.

Because the pressure driver is a trim or supplement to the passive device, failure of any part of the active control system will not result in total failure, as the passive device is still present to reduce dynamics. Thus the pressure driver will be able to extend the range and ability beyond the passive device's capability. As noted above, the feedback signal 52 (combustion dynamics level and frequency) plus the active control system status can be sent to the main turbine controller 60 for failed signal detection and other monitoring or function control purposes.

Figure 3:
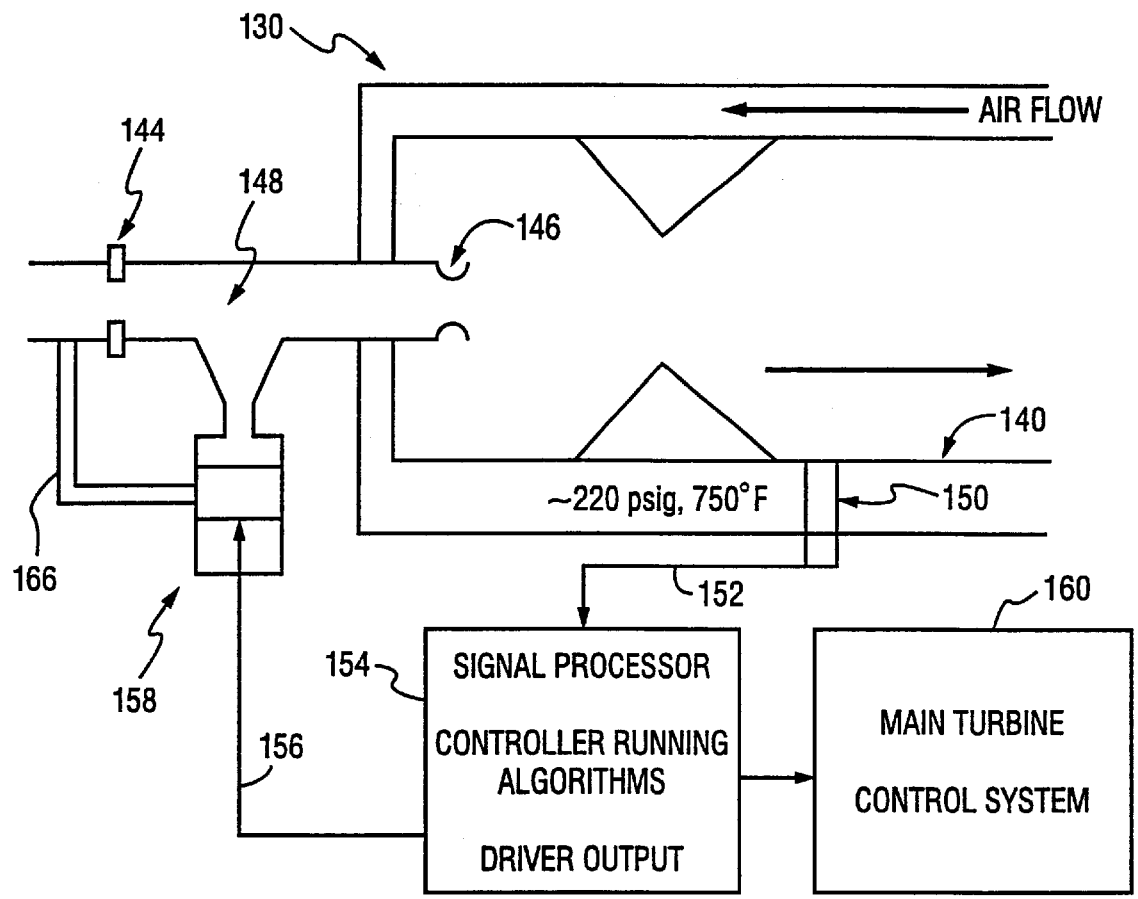
FIG. 3 is a schematic illustration of a combustor layout with active dynamic feedback control in accordance with another, alternate embodiment of the invention.

Referring now to FIG. 3, there is shown therein an alternate embodiment of the invention. In this embodiment components that correspond to or replace components illustrated in the FIG. 2 embodiment are identified with reference numerals corresponding to those used in FIG. 2, advanced by 100.

Similar to the active control system of FIG. 2, the active control system provided in the embodiment of FIG. 3 includes a sensor 150 operatively coupled to the reaction zone liner 140 of combustor 130 for detecting pressure fluctuations and/or other variables comprising inputs to the feedback system. The system processor 154 receives the sensor feedback signal 152 as input and transforms that signal into a suitable control signal 156 for output to the control device 158. Again, the system processor 154 desirably has multiple capabilities including control execution and output signal processing. Information from the system processor 154 can also be sent to the main control system 160, as in the embodiment of FIG. 2.

In the embodiment of FIG. 3, the control device 158 is a volume driver. More specifically, in this embodiment, a small valve 158 is provided in lieu of the pressure driver 58 of the first embodiment. As a source of high pressure fluid, fuel is bypassed around the upper, main pressure drop orifice 144 via conduit 166 to valve 158. As in the embodiment of FIG. 2, the pressure of the fuel upstream of the upstream orifice 144 is about 290 psig and the fuel downstream thereof is about 210 psig. The bypassed fuel can thus be selectively discharged into the captured response volume 148 between the two orifices 144 and 146 for affecting/countering the sensed fluctuations downstream. As is apparent, this valve does not require pressure compensation and may be driven by a system processor 154 generally corresponding to that of the first embodiment.

To accommodate the volume driver 158, the two stage nozzle design detail of this embodiment is slightly different than that of the first embodiment. Indeed, the two stage nozzle design detail may vary from system to system, e.g., depending upon the control device selected. However, as is apparent, this system enjoys substantially all the advantages described above with respect to the first embodiment.

As noted above, the active control of the invention has been described as applied to the fuel supply of a single combustor. For a gas turbine with multiple combustors, it is apparent that each combustor operates at a slightly different condition. This means that at any point in time each chamber will have a different amplitude and frequency of combustion pressure oscillations. Further, in general the dynamic pressure oscillations in the various chambers will not be in phase. Thus, an active control system which acts on the overall gas turbine fuel system would not provide an optimal control for all chambers. The invention overcomes this by placing a small control device at each chamber. Furthermore, the control device is downstream of the main fuel nozzle pressure drop thereby isolating the control actions in one chamber from the adjacent chambers. Overall flow control to the various chambers is also maintained by the upstream orifice of the two stage nozzle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a gas turbine combustor in a lean premixed combustion mode, wherein the combustor has discrete fuel and air delivery systems, a fuel/air premixer zone, and a reaction zone, comprising:

supplying air from an air supply system through at least one opening into the premixer zone of the combustor, said air having a predetermined pressure upstream of said opening;

supplying fuel from a fuel supply system, including a nozzle having a fuel passage and a discharge orifice for delivering said fuel, into the premixer zone of the combustor;

reducing the pressure of said fuel upstream of said fuel discharge orifice to approximately said predetermined pressure, said air supply opening and said fuel discharge orifice having substantially the same pressure drop;

sensing at least one of pressure, temperature and velocity fluctuations in said reaction zone and generating a feedback signal; and actuating a control device operatively coupled to said fuel passage downstream from a locus of said pressure reduction and upstream of said fuel discharge orifice to affect fuel flow therein in response to said feedback signal, whereby pressure fluctuations in the premixer zone resulting from fuel/air concentration oscillations are substantially minimized or eliminated.

2. A method as in claim 1, wherein said control device comprises a pressure driver including a membrane for generating pressure fluctuations, a front face of said membrane being exposed to said fuel passage downstream from said locus of said pressure reduction and upstream of said fuel discharge orifice.

3. A method as in claim 2, wherein a backside of said pressure driver membrane is in flow communication with said air supply system upstream of said air supply opening so as to be maintained at said predetermined pressure.

4. A method as in claim 1, wherein said sensing step comprises sensing pressure fluctuations in said reaction zone with a microphone operatively coupled to a wall of said reaction zone.

5. A method as in claim 1, wherein said step of reducing the pressure of said fuel comprises reducing the pressure of said fuel from a pressure of about 290 psig to a pressure of about 210 psig and wherein said predetermined pressure of said air upstream of said air supply opening is about 220 psig.

6. A method as in claim 1, wherein said control device comprises a volume driver including a valve for selectively injecting a fluid into said fuel passage of said nozzle upstream of said fuel discharge orifice and downstream from said locus of said pressure reduction.

7. A method as in claim 6, wherein said volume driver comprises a valve in flow communication with said fuel supply system upstream of said locus of pressure reduction for selectively supplying fuel at high pressure to said fuel passage downstream of said locus of pressure reduction.

8. Apparatus for stabilizing combustion in a gas turbine combustor operable in a lean premixed mode, and having a premixer zone and a reaction zone, comprising:

an air supply system including an opening for delivering air into the premixer zone of the combustor and having a predetermined pressure upstream of said opening;

a nozzle including a fuel passage and a discharge orifice for delivering fuel into the premixer zone;

a pressure reducer upstream of said fuel discharge orifice for reducing the fuel pressure upstream of said fuel discharge orifice to approximately said predetermined pressure, said air supply opening and said fuel discharge orifice having substantially the same pressure drop, a sensor operatively coupled to said reaction zone to sense at least one of pressure, temperature and velocity fluctuations in said reaction zone and to generate a feedback signal; and a control device operatively coupled to said fuel passage of said nozzle downstream from said pressure reducer and upstream of said fuel discharge orifice to affect fuel flow in the nozzle in response to said feedback signal, whereby pressure fluctuations in the premixer zone resulting from fuel/air concentration oscillations are substantially minimized or eliminated.

9. An apparatus according to claim 8, including a volume in said fuel passage upstream of said fuel discharge orifice, said control device being operatively coupled to said volume.

10. An apparatus according to claim 8 wherein said pressure reducer includes an orifice in said fuel passage upstream of said fuel discharge orifice, said upstream orifice affording a higher pressure drop than the pressure drop across said fuel discharge orifice, said nozzle defining a volume in said fuel passage between said upstream orifice and said fuel discharge orifice at substantially the same pressure as said predetermined pressure, said control device being operatively coupled to said volume.

11. An apparatus as in claim 8, wherein said sensor comprises a microphone operatively coupled to a wall of said reaction zone.

12. An apparatus as in claim 8, wherein said control device comprises a pressure driver having a membrane, a front side of which is exposed to said fuel passage for selectively applying a pressure pulse to said fuel passage.

13. An apparatus as in claim 12, wherein a back side of said membrane is in flow communication with said air supply system upstream of said air supply opening whereby said backside exposed to said predetermined pressure.

14. An apparatus as in claim 8, wherein said control device comprises a volume driver.

15. An apparatus as in claim 14, wherein said volume driver comprises a valve in flow communication with fuel at elevated pressure disposed upstream of said pressure reducer for selectively injecting said fuel into said fuel passage.

* * * * *